United States Patent
Jahanshahi et al.

(10) Patent No.: US 10,481,562 B2
(45) Date of Patent: Nov. 19, 2019

(54) METHOD AND ARRANGEMENT FOR AUTOMATIC TUNING OF A CONTROLLER

(71) Applicant: Siemens Aktiengesellschaft, Munich (DE)

(72) Inventors: Esmaeil Jahanshahi, Trondheim (NO); John Bradford Schofield, Geneva (CH); Selvanathan Sivalingam, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 173 days.

(21) Appl. No.: 15/555,992

(22) PCT Filed: Mar. 15, 2016

(86) PCT No.: PCT/EP2016/055550
§ 371 (c)(1),
(2) Date: Sep. 6, 2017

(87) PCT Pub. No.: WO2016/150761
PCT Pub. Date: Sep. 29, 2016

(65) Prior Publication Data
US 2018/0059626 A1  Mar. 1, 2018

(30) Foreign Application Priority Data

Mar. 23, 2015 (EP) .................................. 15160327

(51) Int. Cl.
| | | |
|---|---|---|
| *G05B 13/02* | (2006.01) | |
| *G05B 11/42* | (2006.01) | |
| *G05B 19/042* | (2006.01) | |
| *G05B 19/42* | (2006.01) | |
| *G05B 23/02* | (2006.01) | |

(52) U.S. Cl.
CPC ............ *G05B 13/024* (2013.01); *G05B 11/42* (2013.01); *G05B 13/025* (2013.01);
(Continued)

(58) Field of Classification Search
CPC .... G05B 11/42; G05B 13/024; G05B 13/025; G05B 19/0426; G05B 19/42; G05B 23/0202
See application file for complete search history.

(56) References Cited

U.S. PATENT DOCUMENTS

| | | |
|---|---|---|
| 5,453,925 A | 9/1995 | Wojsznis et al. |
| 2015/0057812 A1* | 2/2015 | Zhao ................ G05B 13/0205 700/276 |

FOREIGN PATENT DOCUMENTS

| | | |
|---|---|---|
| EP | 0530170 A1 | 3/1993 |
| EP | 2988186 A1 | 2/2016 |

(Continued)

OTHER PUBLICATIONS

Leonard et al. "Two Steps Relay Auto-Tuning in the Presence of Static Load Disturbance" from "UKACC International Conference on Control '98, Sep. 1-4, 1998" (Year: 1998).*

(Continued)

*Primary Examiner* — Yuhui R Pan
(74) *Attorney, Agent, or Firm* — Harness, Dickey & Pierce, P.L.C.

(57) ABSTRACT

A method is described for acquiring data for relay-based controller tuning of a controller controlling a system. The method includes determining, based on controller output constraint, a relay amplitude representing an amplitude of a relay signal to be added to steady state controller output to obtain a sum signal to be fed to the system as system input during the acquiring data for relay-based controller tuning; and starting acquiring controller output data and system output data when detecting a steady state of system output while controller output is fed to the system as system input.

15 Claims, 3 Drawing Sheets

(52) U.S. Cl.
CPC ......... *G05B 19/0426* (2013.01); *G05B 19/42* (2013.01); *G05B 23/0202* (2013.01)

(56) References Cited

FOREIGN PATENT DOCUMENTS

| EP | 2988186 B1 * | 3/2018 | ......... G05B 23/0232 |
|---|---|---|---|
| WO | WO 8300753 A1 | 3/1983 | |

OTHER PUBLICATIONS

Leonard F. et al: "Two steps relay auto-tuning in the presence of static load disturbance", UKACC International Conference on Control '98, Sep. 1-4, 1998, Conference Publication No. 455, pp. 1339-1343.

David I. Wilson: Relay-based PID Tuning, Automation and Control, Feb./Mar. 2005, pp. 10-12; 2005.

PCT International Search Report and Written Opinion of International Searching Authority dated Nov. 12, 2016 corresponding to PCT International Application No. PCT/EP2016/055550 filed Mar. 15, 2016.

PCT Written Opinion of the International Preliminary Examining Authority dated Apr. 10, 2017 corresponding to PCT International Application No. PCT/EP2018/055550 filed Mar. 15, 2016.

PCT International Preliminary Report on Patentability dated Jul. 10, 2017 corresponding to PCT International Application No. PCT/EP2016/055550 filed Mar. 15, 2016.

Extended European Search Report dated Nov. 13, 2015.

\* cited by examiner

METHOD AND ARRANGEMENT FOR AUTOMATIC TUNING OF A CONTROLLER

PRIORITY STATEMENT

This application is the national phase under 35 U.S.C. § 371 of PCT International Application No. PCT/EP2016/055550 which has an International filing date of Mar. 15, 2016, which designated the United States of America and which claims priority to European patent application number EP15160327.1 filed Mar. 23, 2015, the entire contents of which are hereby incorporated herein by reference.

FIELD

An embodiment of present invention generally relates to a method and to an arrangement for acquiring data for relay-based controller tuning of a controller controlling a system, wherein an automatic relay-based controller tuning method is enabled.

BACKGROUND

A controller, such as a PID controller (Proportional-Integral-Derivative controller) is a control loop feedback mechanism widely used in industrial control systems. Thereby, typically, a controller, in particular a PID controller, may calculate an error value as the difference between a measured process variable (also referred to as system variable) and a desired set-point of the process variable. The controller then attempts to minimize the error by adjusting the process variable through use of a manipulated variable, in particular by feeding or supplying a controller output to the process or system.

The PID controller is characterized by three separate controller parameters, also known as PID-controller parameters. In order to control the system or process appropriately, the PID-controller parameters need to be known in advance. Determining the controller parameters may also be referred to as tuning the three or less controller parameters.

In conventional methods and applications, a manual tuning has been applied or a so-called Ziegler-Nichols method has been applied. However, it has been observed that conventional methods and arrangements for enabling to tune controller parameters may require operator/engineer intervention for a relay tuning test. Often a priori knowledge of relay parameters may be required. Thereby, conventional tuning methods are very cumbersome and time-consuming and may require human intervention.

EP 0530170 (A1) discloses a system for tuning at least one control parameter of a controller in a control loop wherein the system includes an oscillation function not in series with the controller for selectively causing the control loop to oscillate at a tuning frequency, while the controller is in control of the process. While oscillating at the tuning frequency, a tuner is responsive to the tuning gain of the control loop and its tuning frequency for determining control parameters for tuning the controller.

U.S. Pat. No. 5,453,925 A discloses a system and method for automatically tuning a process controller used to control an industrial process, or the like, wherein the controller is removed from closed-loop control of a process under control, and a signal is applied to the process under control to cause the process to undergo controlled self-oscillation. A first portion of the self-oscillation procedure is used to determine a Time Delay characteristic of the process under control, and a subsequent portion of the self-oscillation procedure as used to calculate an Ultimate Gain characteristic and an Ultimate Period characteristic of the process under control. These three characteristics are then used to calculate control parameters which are used to tune the controller.

WO 8300753 A1 discloses a method and apparatus in tuning a PID regulator, where the process and the regulator has a transfer function G(s) in common, a method is proposed for bringing the system into self-oscillation for measuring the amplitude and frequency of the oscillation and tuning the regulator in dependence of the measurements obtained. A circuit function (NL) having non-linear characteristic and a describing function N(A) is introduced into the system in series to the process for acting on the regulator signal. Self-oscillation is obtained if $(G(i\ omega) \cdot N(A) = -1$ for at least one value of the angular frequency omega and the amplitude A of the regulator signal.

The publication "Relay-based PID tuning" by David I. Wilson, Automation and Control, February/March 2005 discloses a method to tune parameters of a PID controller. Thereby, a relay with amplitude d is replaced for the PID controller usually controlling a plant or process. The system is then started and the plant output amplitude "a" and period "P" is recorded. From the recorded or measured amplitude "a" and period "P" eventually, the ultimate gain is calculated and the ultimate period is obtained. From the ultimate gain and period, the PID tuning parameters are found. This method may require user input of particular operational parameters.

SUMMARY

The inventors have discovered that there may be a need for a method and arrangement for acquiring data for relay-based controller tuning that is performable in a simple manner and results in an accurate determination of the tuning parameters. Further, the inventors have discovered that there may be a need for a method for preparing to acquire the data for the relay-based controller tuning, i.e. in a simple and resource effective manner to set up or determine operational parameters required for performing a relay-based controller tuning procedure.

Advantageous embodiments of the present invention are described by the claims.

According to an embodiment of the present invention, a method is provided for estimating relay parameter for acquiring data for relay-based controller tuning of a controller controlling a system, comprising: starting acquiring controller output data and system output data when detecting a steady state of system output while controller output is fed to the system as system input; determining, based on controller output constraint and on the acquired controller output data and system output data, a relay amplitude representing an amplitude of a relay signal to be added to steady state controller output to obtain a sum signal to be fed to the system as system input during the acquiring data for relay-based controller tuning.

According to an embodiment of the present invention, an arrangement is provided. The arrangement is for estimating relay parameter for acquiring data for relay-based controller tuning of a controller controlling a system, comprising: a processor adapted to start acquiring controller output data and system output data when detecting a steady state of system output while controller output is fed to the system as system input; to determine, based on controller output constraint and on the acquired controller output data and system output data, a relay amplitude representing an amplitude of a relay signal to be added to steady state controller output to obtain a sum signal to be fed to the system as system input during the acquiring data for relay-based controller tuning. The arrangement may be implemented in hardware and/or software. The arrangement may comprise input and/or output devices for user interaction.

According to an embodiment of the present invention, a method is provided for estimating relay parameter for acquiring data for relay-based controller tuning of a controller controlling a system, comprising: starting acquiring controller output data and system output data when detecting a steady state of system output while controller output is fed to the system as system input; determining, based on controller output constraint and on the acquired controller output data and system output data, a relay amplitude representing an amplitude of a relay signal to be added to steady state controller output to obtain a sum signal to be fed to the system as system input during the acquiring data for relay-based controller tuning.

The method may be suitable for a PID controller. The method does not need to necessarily actually acquire the data for the relay-based controller tuning, but may primarily prepare for acquiring the data for the relay-based controller tuning. Optionally, the method may also comprise to acquire the data for relay-based controller tuning, in particular based on the relay amplitude. The method may for example be performed by an electronic processor, by a software module, by a hardware unit or a combination of aforementioned entities. The method may not require any interaction by a human user besides starting the method.

However, the method may require or access one or more system variables, such as data regarding or parameters regarding controller output constraint. The method may further access system input and/or output constraint parameters.

According to embodiments of the present invention, a fully automatic tuning procedure may be established, wherein a number of sub-procedures may be included. For example, an existence of a consistent steady-state behavior in a loop may be detected. Furthermore, a steady-state offset may be detected. Additionally, use of a pseudo set-point instead of the external set-point may be applied, if an offset is detected. Further, the relay hysteresis and a safe but sufficient amplitude for relays may be estimated or determined.

The relay amplitude may represent the amplitude of a rectangular signal which is fed, during the acquisition of data for tuning, in a sum with the controller output, to the system/plant or process which is to be controlled by the controller. Thereby, the relay amplitude is determined in an automatic manner, without requiring intervention or input by the user. Thereby, the controller output constraint may comprise one or more threshold values or the like.

In at least one embodiment, the inventors have found a delicate procedure to determine the relay amplitude based on controller output constraint that results in a safe but sufficiently large relay amplitude so that the relay-based controller tuning may be performed, using the determined relay amplitude, in a successful manner to eventually determine the controller parameters.

Embodiments of the present invention may have at least one of the following advantages: The method may be fully automated and operator/engineer interference may not be required. The method may ensure safety of the process when the relay test is actually performed, since the controller output constraint and further safety constraints may be met. The method may be implemented for a large-scale industrial process or processes.

According to an embodiment, a first step relay amplitude (RAMP1) is set as follows:

$$RAMP1 = f1 * ABS(Y\_WIN),$$

wherein f1 is between 0.08 and 0.12, in particular 0.1,
Y_WIN is a controller output averaged over a moving window having fixed width,
wherein the relay amplitude (RAMP) is based on the first step relay amplitude (RAMP1).

The controller output may in general be referred to "Y", while the system output or process output may in general be referred to as "X". Measurement values such as X-values or Y-values may be acquired digitally, in a sampled fashion. Thus, subsequent samples of the variable values may be acquired having a particular time interval in-between. The moving window may span or cover a number of sample points, wherein the moving window moves when time passes but may have constant width (including constant number of samples). Considering the first step relay amplitude may ensure that the relay amplitude is not too large, to reduce the risk of damaging of components, when the relay-based controller tuning procedure is actually performed.

According to an embodiment of the present invention, a second step relay amplitude (RAMP2) is set as follows:

$$RAMP2 = MAX(RAMP1, ABS(f2 * X\_MU * G^{-1})),$$

wherein
X_MU is a system output averaged over increasing number of samples,
$G^{-1}$ is an inverse of the gain of the controller,
f2 is between 0.08 and 0.12, in particular 0.1,
wherein the relay amplitude (RAMP) is based on the second step relay amplitude (RAMP2).

The consideration of a second step relay amplitude may ensure that the relay amplitude is sufficiently large without introducing the risk of damage of components when the actual relay-based controller tuning is performed on the real system.

According to an embodiment of the present invention, the determining the relay amplitude (RAMP) is further based on a relay hysteresis (HYS), as given by:

$$HYS = f4 * X\_STD$$

wherein
f4 is between 4 and 6, in particular 5, $$X\_STD = sqrt(Var\_X)$$

Var_X is recursive mean of VX or low pass filtered mean of VX $$VX = Sqr(X - X\_WIN)$$

X_WIN is windowed mean of system output (X), in particular NWindow=64.

The relay hysteresis may account for noise which may be comprised in the system output data. During performing the relay-based controller tuning, the system output X may be monitored and when the system output X crosses from below or above the reference value of the system output, the relay signal may switch from high to low or low to high. However, the system output X may comprise noise which may involve strong fluctuations or spikes which could result in an erroneous detection of the crossing of the reference system output value. In order to reduce an erroneous detection of the crossing of the reference system output value, the relay hysteresis is calculated and is determined as proportional to the standard deviation of the system output X. Thereby, the tuning method may be improved.

According to an embodiment of the present invention, if ABS(X−XR) is larger than relay hysteresis (HYS), then the relay signal switches from low to high or from high to low.

If, for example, the system output X approaches from above the reference system output value, a switching of the relay signal may only be effected, if the system output X is more than the value of the relay hysteresis below the reference system output value. Thereby, erroneous detection of a crossing of X through the reference value line may be reduced or even avoided.

According to an embodiment of the present invention, the controller output constraint comprises an upper limit controller output (PHOUT) and a lower limit controller output (PLOUT), wherein a third step relay amplitude (RAMP3) is set as follows:

RAMP3=MAX(RAMP2,PRAMP_MIN), wherein

PRAMP_MIN=5*HYS*MAX($G^{-1}$,ABS(Y MAX)/ABS(X_MU)),

HYS is relay hysteresis,

Y MAX=f3*MIN(Yss−PLOUT,PHOUT−Yss), f3 is between 0.85 and 0.95, in particular 0.9,
Yss is a steady state controller output,
wherein the relay amplitude (RAMP) is based on the third step relay amplitude (RAMP3).

Satisfying the controller output constraint may reduce risk of damage of the controller and/or the system. The heuristic found by the inventors may allow to safely perform the actual relay-based controller tuning.

According to an embodiment of the present invention, the relay amplitude (RAMP) is obtained according to:

RAMP=MIN(RAMP3,ABS(Y MAX)).

Thereby, an additional safety measure may be achieved.

According to an embodiment of the present invention, steady state of system output is detected,
if X_WIN is between X_UL and X_LL, setting Index=1,
wherein

X_UL=X_MU+0.5*X_STD

X_LL=X_MU−0.5*X_STD.

The relay amplitude may be in a more accurate manner be determined, if immediately before starting the relay-based controller tuning, the system output is in a steady-state. Thereby, erroneous or misleading oscillations or drifts of the system output which may be due to erroneous determination of relay hysteresis may be reduced or even avoided.

In other embodiments, another factor of instead of "0.5" may be set in front of X_STD, such as between 0.4 and 0.6.

According to an embodiment of the present invention, the method further comprises detecting a steady-state offset comprising performing:
If ABS(X_WIN−XR) is greater than 2*X_STD,
then setting BOFS=1,
else setting BOFS=0,
wherein
XR is a system output reference value,
BOFS is an offset flag.

Ideally, the steady-state should result in the system output being equal to the reference system output. However, due to disturbances or misadjustments or the like, the steady-state system output may be different from the intended system output reference. In this case, a detection of the occurrence of the steady-state offset may be advantageous for adjusting for example the previous output reference value to a new system output reference value according to setting a new system output reference value (SETPOINT) by performing:
If (Index=1 and BOFS=1),
then set SetPoint=X_MU;
else set SetPoint=XR.

The new system output reference value may be used in the subsequent relay-based controller tuning, in order to more accurately determine the controller parameters.

According to an embodiment of the present invention, the method further comprises determining a inverse gain ($G^{-1}$) of the controller by:
estimating windowed maximum of controller output, Y_MAX
estimating windowed minimum of controller output, Y_MIN
estimating windowed maximum of process output, X_MAX
estimating windowed minimum of process output, X_MIN
setting INVGtemp=(Y_MAX−Y_MIN)/(X_MAX−X_MIN);
Setting $G^{-1}$=Recursive mean of INVGtemp.

In this manner, the gain and also the inverse of the gain may be determined in an accurate and simple manner. The gain or inverse gain may be used in further method steps.

According to an embodiment of the present invention, for performing relay-based controller tuning, controller output data (Y) and system output data (X) are acquired, while the sum signal (Y+/−RAMP) is fed to the system as system input data using relay amplitude as determined previously.

Thereby, actually, the relay-based controller tuning is performed. Thereby, controller output data and system output data may be collected, stored and analyzed, to eventually determine an amplitude of the system output and also to determine the period (in particular repetition period) of the system output. The calculations and analyses may be done in a similar way as is disclosed in the above-mentioned publication "Relay-based PID tuning" by David I. Wilson, the entire contents of which are hereby incorporated herein by reference. Further, the PID tuning constants or PID parameters may be determined based on the analysis of the experimental data, i.e. the system output X and the controller output Y as described by David I. Wilson.

The method may first prepare or determine operational parameters (e.g. relay amplitude) for later conducting the relay-based controller tuning without actually performing the relay-based controller tuning procedure. For determining the relay amplitude including further steps as described above, the controller may supply its controller output to the system as system input.

According to an embodiment of the present invention, for performing relay-based controller tuning, controller output data (Y) and system output data (X) may be acquired over several cycles of the relay signal switching from low to high or from high to low.

The relay system may alternate between two levels, a low level and a high level.

According to an embodiment of the present invention, the acquiring controller output data (Y) and system output data (X) is stopped, if several cycles are performed a maximum number of times or if the controller output is outside [PLOUT, PHOUT]. Thereby, an additional safety measure is provided.

It should be noted that features that have been individually or in any combination disclosed, described or explained with respect to a method for acquiring data for relay-based controller tuning may also be applied to an arrangement for acquiring data for relay-based controller tuning of a controller controlling a system according to an embodiment of the present invention and vice versa.

According to an embodiment of the present invention, an arrangement is provided. The arrangement is for estimating relay parameter for acquiring data for relay-based controller tuning of a controller controlling a system, comprising: a processor adapted to start acquiring controller output data and system output data when detecting a steady state of system output while controller output is fed to the system as system input; to determine, based on controller output constraint and on the acquired controller output data and system output data, a relay amplitude representing an amplitude of a relay signal to be added to steady state controller output to obtain a sum signal to be fed to the system as system input during the acquiring data for relay-based controller tuning. The arrangement may be implemented in hardware and/or software. The arrangement may comprise input and/or output devices for user interaction.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described by reference to the accompanying drawings. The invention is not restricted to the illustrated or described embodiments.

DETAILED DESCRIPTION OF THE EXAMPLE EMBODIMENTS

Figure 1:
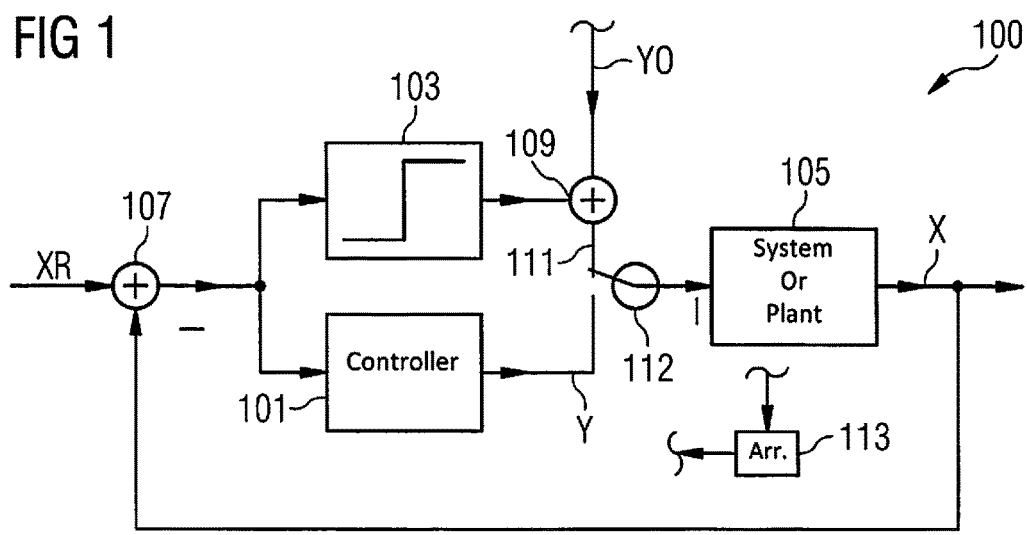
FIG. 1 schematically illustrates a control system which may be set up for performing a relay-based tuning procedure according to embodiments of the present invention.

The illustration in the drawings is in schematic form.

The system 100 illustrated in FIG. 1 comprises a controller 101, a relay module 103, a system or plant 105 and an addition element 107. The system 105 outputs system output data X, the controller 101, in particular a PID controller, outputs controller output data Y. The relay 103 outputs a relay signal 109 which may oscillate according to a rectangular pattern which may be added to the steady state controller output Y0 of the controller 101 and may be fed to the system 105 during a relay-based controller tuning procedure. During estimation of a relay parameter (and during normal operation after having tuned the controller 101) the switching element 112 connects the controller output Y with the Input I of the system 105. The system output X is fed back and supplied to the addition element 107 where its negative is added to a set-point XR representing a desired system output.

The system 100 further comprises an arrangement 113 for acquiring data/estimation of relay parameters for relay-based controller tuning of the controller 101 controlling the system 105 according to an embodiment of the present invention. Thereby, the arrangement 113 comprises a processor which is adapted to determine, based on controller output constraint, such as PLOUT and PHOUT, a relay amplitude RAMP, such as illustrated in FIG. 2, graph 203 and adapted to start acquiring controller output data (Y) and system output data (X) when a steady-state of the system output (X) is detected, while the controller output Y is fed to the system 105 as system input 111.

The arrangement 113 is adapted to perform a method for acquiring data for relay-based controller tuning/estimating relay parameters according to an embodiment of the present invention.

Figure 2:
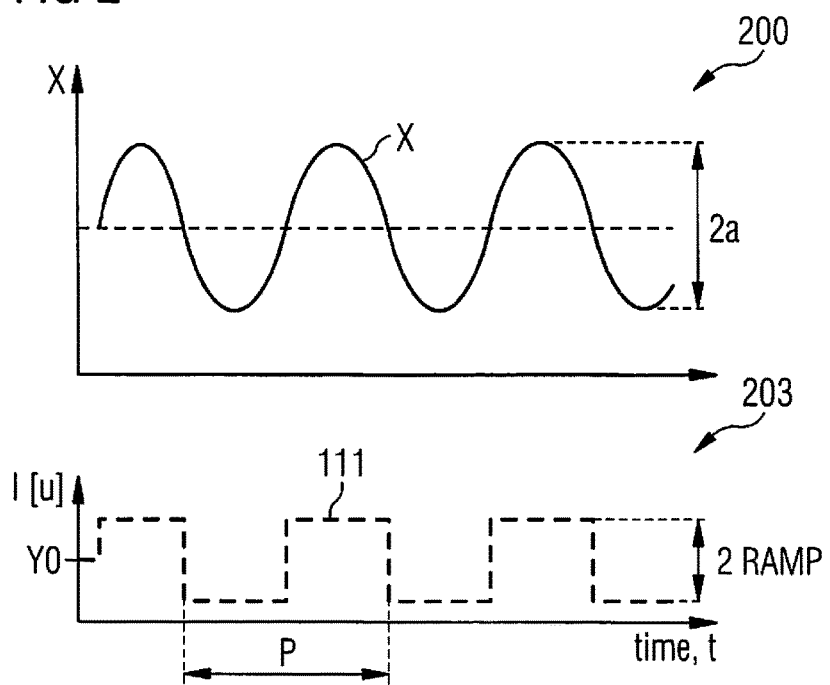
FIG. 2 illustrates graphs of input and output values of the system illustrated in FIG. 1 during methods according to embodiments of the present invention.

During the relay-based tuning procedure, system output data X (graph 201) and controller output data Y (graph 203), as illustrated in FIG. 2, are acquired and analyzed. The graph 203 depicts input data 111 (I) that are supplied to the system 105, wherein the input data I are obtained by adding a steady-state controller output Y0 and the relay signal 109 output by the relay 103, wherein the relay signal 109 is in fact a rectangular system alternating between positive and negative values, wherein the amplitude of the rectangular input signal 111 amounts to 2*RAMP. The system output data X oscillates with the same period P as the system input data 111 (I). From the amplitude RAMP and also the period P and further the amplitude a of the system output data X, the ultimate gain can be calculated to be inversely proportional to the observed amplitude a: $K_u = 4*RAMP/Pi*a$.

From $K_u$ and P, the controller parameters of the controller 101 may be determined according to the Ziegler-Nichols or similar equations.

In order to perform the relay-based tuning procedure, the value for the variable RAMP, i.e. the relay amplitude, needs to be determined. Determination of RAMP is performed according to a method according to an embodiment of the present invention.

Figure 3:
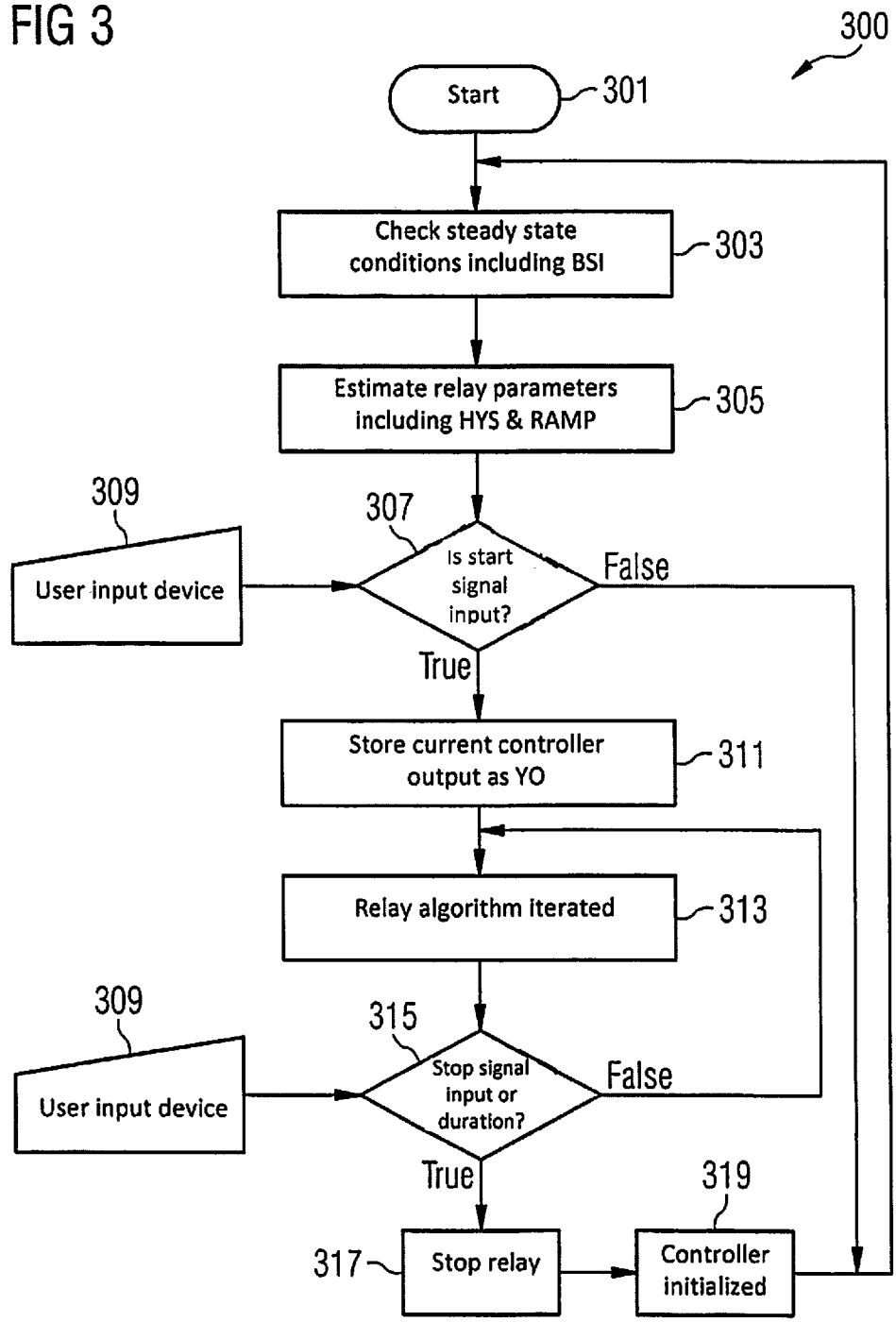
FIG. 3 schematically illustrates a flow-chart for a relay algorithm according to an embodiment of the present invention.

A flow-chart is illustrated in FIG. 3. The method 300 starts at 301. In a function block 303, the steady-state conditions are checked, in particular it is checked the variable BSS, as is referred to below.

In the function block 305, the relay parameters such as the relay hysteresis HYS and the relay amplitude (RAMP) are estimated.

In the decision block 307, the variable BSS is checked and it is checked whether a user using a user input device 309 has inputted a start signal. If BSS as well as Start are true, it is switched to the function block 311, wherein the current controller output, i.e. the controller output at steady-state is stored as Y0. In the function block 313, the relay algorithm is iterated. In the decision block 315 it is checked whether the duration is larger than PMAXCYCL or whether Y>PHOUT or Y<PLOUT or whether a stop signal has been given by the user using the input device 309. If these conditions are met, the relay is stopped in the function step 317 and in a function step 319, the controller is initialized with Y0 and it is returned to functional step 303. If the decision step 315 results in a false value, it is cycled back to the function block 313.

The operator may enable a relay test mode when there exists steady-state conditions (STST=1) in the function block 303 in a control loop. The relay parameters may be estimated by the logic in the function block 305 or, optionally, may be set by the operator. The controller output Y just before enabling the relay test mode is stored as Y0. During performing the relay algorithm (block 313), the experimental data, i.e. controller output data (Y) and system output data (X) may be monitored, stored and later on analyzed. The relay test may be stopped, once a maximum tuning duration, for example 15 cycles, is reached or a user-defined number of cycles is reached, as may be set in the procedural step 315. The test may further be automatically disabled, if there is a controller output constraint violation (Y>PHOUT or Y<PLOUT) or a timeout occurs, as may be checked in method step 315.

In the following, the main algorithms of the method for fully automatic relay test are explained:

A) Detection of Consistent Steady-State
1. Estimate recursive mean of X (or low pass filer)→X_MU
2. Estimate windowed mean of X (NWindow=64)→X_WIN
3. Calculate VX=Sqr(X−X_WIN)
4. Estimate recursive mean of VX (or low pass filter) (mean is not recursive)→Var_X
5. Calculate sqrt (Var_X)→X_STD
6. Calculate X_UL=X_MU+0.5*X_STD
7. Calculate X_LL=X_MU−0.5*X_STD
8. Compare X_WIN with X_UL and X_LL
9. If X_WIN is between X_UL and X_LL→Index=1 otherwise BSS=0
10. Calculate abs(Derivate of Index)→TempIndex
11. Calculate Windowed Integral of TempIndex.→SumIndex
12. If SumIndex=0 and Index=1→BSS=1
13. If not,→BSS=0
14. End.

B) Detection of Steady-State Offset:

BOFS is the offset flag and we set it if the windowed average X_WIN (process output) is far away from the external set-point XR.
If ABS(X_WIN−XR) is greater than 2*X_STD, then set BOFS=1; else set BOFS=0.

C) Choosing Set-Point for Relay Test:

If both the first steady-state Index (step 9 of section A) and the offset flag are set as 1, we use recursive mean of process output (X_MU) as the pseudo set-point for the relay-test:
If (Index=1 and BOFS=1), then set SetPoint=X_MU; else set SetPoint=XR.

D) Estimation of Relay Hysteresis (HYS):

Relay hysteresis is used to prevent the effect of measurement noise on the behavior of relay output. When the process is at steady state, standard deviation of process output is equal to standard deviation of the noise. The relay hysteresis must be chosen based on strength of the noise. From our experience, it is set as $$HYS=5*X\_STD$$

E) Estimation of inverseGain (G−1):

Estimate windowed maximum of controller output, Y_MAX
Estimate windowed minimum of controller output, Y_MIN
Estimate windowed maximum of process output, X_MAX
Estimate windowed minimum of process output, X_MIN
INVGtemp=(Y_MAX−Y_MIN)/(X_MAX−X_MIN);
G−1=Recursive mean of INVGtemp F) Estimation of Relay Amplitude (RAMP):

Maximum deviation of controller output from Yss (steady state value) is found by taking into account PHOUT and PLOUT from PID controller block (FB1407). The safe operation is ensured by this.

$$Y\text{ MAX}=0.9*\text{MIN}(Yss-PLOUT,PHOUT-Yss) \qquad 1.$$

Default value of the relay amplitude is 10% of the controller output $$RAMP1=0.1*ABS(Y\_WIN); \qquad 2.$$

Process response to the relay signal should be 10% of its steady-state value, X_MU.

$$RAMP2=MAX(RAMP1,ABS(0.1*X\_MU*G-1)); \qquad 3.$$

To make sure that the relay amplitude is sufficient to take the process output out of the relay hysteresis.

$$PRAMP\_MIN=5*HYS*MAX(G-1,ABS(Y\text{ MAX})/ABS(X\_MU)); \qquad 4.$$

$$RAMP3=MAX(RAMP2,PRAMP\_MIN);$$

Saturate the relay amplitude to the safe value $$RAMP=MIN(RAMP3,ABS(Y\text{ MAX})); \qquad 5.$$

RAMP1, RAMP2, RAMP3 being also referred to as first, second, third step relay amplitude, respectively.

Embodiments of the present invention may also be applied to control systems set up in a cascade configuration. Thereby, two or more controllers may be connected in cascade configuration. At such configuration, the output SLV_INF (slave_INF) on the slave controller may be always connected to input master_INF (MST_INF) on the master controller. Saturation of the controller output in the slave controller may be expected, when the tune mode in the master controller is enabled. When the slave controller is put in the tuning mode, function input X1 in master controller may take the current value and force tracking is enabled in master controller until the tune mode in slave controller is disabled. When the tuning mode is disabled in the slave controller, force tracking mode in both master and slave controllers may be disabled.

Figure 4:
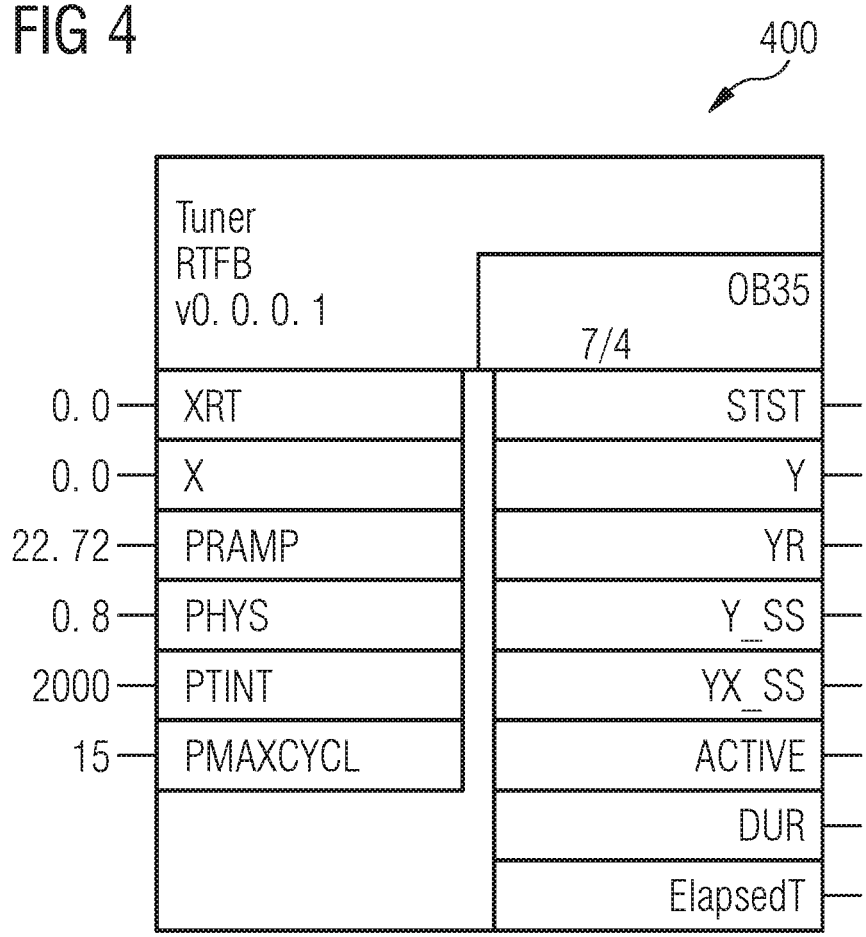
FIG. 4 schematically illustrates a function block used to automate relay-based tuning tests according to an embodiment of the present invention.

FIG. 4 schematically illustrates a function block representing an implementation of one or more method steps according to embodiments of the present invention.

The following notation is used:
XRT A structure that receives necessary values from PID Function Block (FB1407)
X Process output
PTIMEOUT Time out for stopping the relay test (Maximum time to finish three cycles)
PRAMP Relay amplitude
PHYS Relay hysteresis
PTINT Integral time for disturbance rejection
PMAXCYCLE Maximum tuning duration in number of cycles
Y Controller output
YR Chosen setpoint Y_SS Value of controller output at steady state
YX_SS Value of process output at steady state
ACTIVE Status of relay activation mode
DUR Tuning duration in number of cycles
ElapsedT Elapsed time of relay test The function block 400 illustrated in FIG. 4 is to be used in series with the PID function block (for example the controller 101 illustrated in FIG. 1) to induce oscillations in a closed loop under highly controlled conditions for obtaining suitable data, such as system output data X, controller output data Y or system input data 111 (see FIG. 1). The RTFB (Relay Tuning Function Block that implements relay based tuning experiment in a control loop) maintains both controller and process outputs between user-specific or default low and high levels (PLOUT and PHOUT).

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method of determining a relay parameter usable during acquiring of data for relay-based controller tuning of a controller, usable to control a system, comprising:
   starting acquiring of controller output data and system output data in response to detecting a steady state of system output while controller output is fed to the system as system input; and
   determining, based on controller output constraint and on the controller output data acquired and the system output data acquired, a relay parameter representing an amplitude of a relay signal to be added to steady state controller output to obtain a sum signal to be fed to the system as the system input during the acquiring of the data for relay-based controller tuning,
   wherein a first step relay amplitude (RAMP1) is set as follows:

RAMP1=$f1$*ABS($Y$_WIN), wherein f1 is between 0.08 and 0.12, Y_WIN is a controller output averaged over a moving window having a fixed width, and the relay parameter representing an amplitude of the relay signal is based on the first step relay amplitude (RAMP1),
   wherein a second step relay amplitude (RAMP2) is set as follows:

RAMP2=MAX(RAMP1,ABS($f2$*$X$_MU*$G^{-1}$)), wherein X is a system output, X_MU is a system output averaged over increasing number of samples, $G^{-1}$ is an inverse of a gain of the controller, f2 is between 0.08 and 0.12, and the relay parameter representing an amplitude of the relay signal is based on the second step relay amplitude (RAMP2).

2. The method of claim 1, wherein the determining of the relay parameter is further based on a relay hysteresis (HYS), as given by:

HYS=$f4$*$X$_STD wherein
   f4 is between 4 and 6,
   X_STD=sqrt (Var_X),
   Var_X is a recursive mean of VX or low pass filtered mean of VX,
   VX=Sqr (X−X_WIN), and
   X_WIN is windowed mean of system output (X).

3. The method of claim 2, wherein, the relay signal switches from low to high or from high to low in response to ABS(X−XR) being larger than the relay hysteresis (HYS), wherein XR is a system output reference value.

4. The method of claim 1, wherein the controller output constraint comprises an upper limit controller output (PHOUT) and a lower limit controller output (PLOUT), wherein a third step relay amplitude (RAMP3) is set as follows:

RAMP3=MAX(RAMP2,$P$RAMP_MIN), wherein $P$RAMP_MIN=5*HYS*MAX($G^{-1}$,ABS($Y$MAX)/ABS($X$_MU)), HYS is relay hysteresis, $Y$MAX=$f3$*MIN($Y$ss−PLOUT,PHOUT−$Y$ss), f3 is between 0.85 and 0.95,
   Yss is a steady state controller output, and
   wherein the relay parameter representing an amplitude of the relay is based on the third step relay amplitude (RAMP3).

5. The method of claim 4, wherein the relay parameter representing an amplitude of the relay (RAMP) is obtained according to:

RAMP=MIN(RAMP3,ABS($Y$MAX)).

6. The method of claim 1, wherein
   steady state of system output is detected,
   if X_WIN is between X_UL and X_LL, setting Index=1,
   wherein $X$_UL=$X$_MU+0.5*$X$_STD, and $X$_LL=$X$_MU−0.5*$X$_STD, wherein X is a system output or process output, X_UL is a threshold upper limit and X_LL is a threshold lower limit and X_WIN is a windowed mean of X.

7. The method of claim 6, further comprising:
   detecting a steady-state offset comprising performing:
   If ABS(X_WIN−XR) is greater than 2*X_STD,
   then setting BOFS=1,
   else setting BOFS=0,
   wherein
   XR is a system output reference value,
   BOFS is an offset flag and
   X_STD=sqrt (Var_X), Var_X being a recursive mean of VX or low pass filtered mean of VX.

8. The method of claim 7, further comprising:
   setting a new system output reference value (SETPOINT) by performing:
   If (Index=1 and BOFS=1),
   then set SetPoint=X_MU;
   else set SetPoint=XR.

9. The method of claim 1, further comprising:
   determining an inverse gain ($G^{-1}$) of the controller by:
   estimating windowed maximum of controller output, Y_MAX
   estimating windowed minimum of controller output, Y_MIN
   estimating windowed maximum of process output, X_MAX
   estimating windowed minimum of process output, X_MIN
   setting INVGtemp=(Y_MAX−Y_MIN)/(X_MAX−X_MIN); and
   setting $G^{-1}$=Recursive mean of INVGtemp.

10. The method of claim 1, wherein, for performing relay-based controller tuning, controller output data and system output data are acquired, while the sum signal is fed to the system as system input data using relay amplitude as determined previously.

11. The method of claim 1, wherein, for performing relay-based controller tuning, controller output data and system output data are acquired over several cycles of the relay signal switching from low to high or from high to low.

12. The method of claim 1, wherein the acquiring of the controller output data and the system output data is stopped, in response to several cycles being performed a maximum number of times or if the controller output is outside a range bounded by PLOUT, PHOUT, wherein PLOUT is lower limit controller output and PHOUT is an upper limit controller output.

13. The method of claim 1, wherein f1 is 0.1.

14. The method of claim 2, wherein f4 is 5.

15. An arrangement for determining a relay parameter usable during acquiring of data for relay-based controller tuning of a controller to control a system, comprising:
a processor configured to
start acquiring of controller output data and system output data in response to detecting a steady state of system output while controller output is fed to the system as system input; and
determine, based on controller output constraint and on the controller output data acquired and the system output data acquired, a relay parameter representing an amplitude of a relay signal to be added to steady state controller output to obtain a sum signal to be fed to the system as the system input during the acquiring of the data for relay-based controller tuning,
wherein a first step relay amplitude (RAMP1) is set as follows:

$RAMP1 = f1 * ABS(Y\_WIN)$, wherein f1 is between 0.08 and 0.12, Y_WIN is a controller output averaged over a moving window having a fixed width, and the relay parameter representing an amplitude of the relay signal is based on the first step relay amplitude (RAMP1),
wherein a second step relay amplitude (RAMP2) is set as follows:

$RAMP2 = MAX(RAMP1, ABS(f2 * X\_MU * G^{-1}))$, wherein X is a system output, X_MU is a system output averaged over increasing number of samples, $G^{-1}$ is an inverse of a gain of the controller, f2 is between 0.08 and 0.12, and the relay parameter representing an amplitude of the relay signal is based on the second step relay amplitude (RAMP2).

* * * * *